Oct. 30, 1928.
A. J. JANECEK
1,689,489
TEMPERED AIR DIRECTIONER
Original Filed Oct. 30, 1925
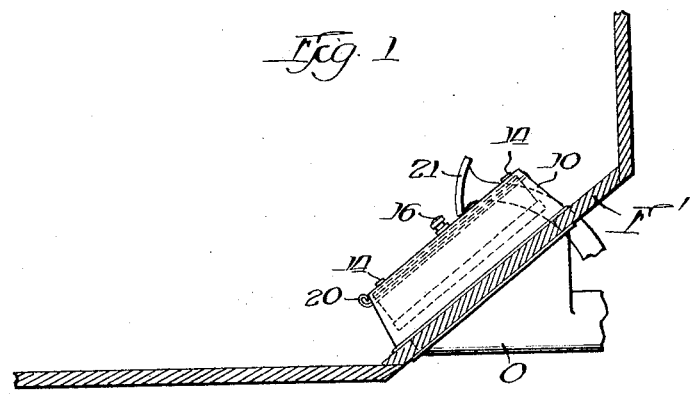
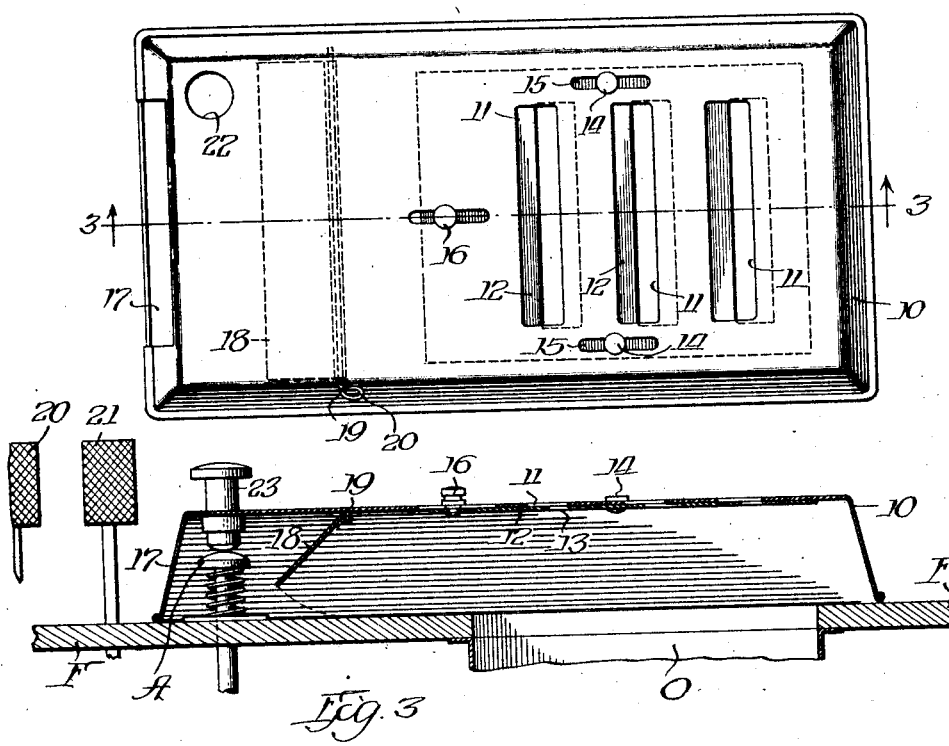
Inventor
Adolph J. Janecek Patented Oct. 30, 1928.

1,689,489

UNITED STATES PATENT OFFICE.

ADOLPH J. JANECEK, OF CEDAR RAPIDS, IOWA.

TEMPERED-AIR DIRECTIONER.

Application filed October 30, 1925, Serial No. 65,720. Renewed November 4, 1927.

My invention relates to air flow controlling or directioning devices of particular utility in automotive vehicles for controlling and directing the flow of heated air or cooling air to locations desired.

In automotive vehicles, heating devices are usually installed for use in cold weather, such devices receiving their heat from the engine exhaust gases. In winter time the space around the clutch and brake pedals and around the accelerator button becomes very cold, owing to the openness of such space to the exterior of the car. Heat or heated air outlets have been provided in the foot board of the vehicle at one side of the pedals, but as no heat directioning apparatus was applied, the issuing heat distributed itself through the car and the space around the pedals received very little of this heat. An important object of my invention is, therefore, to provide apparatus which can be associated with or attached to or over the heated air outlet to receive the issuing heat or heated air, and being provided with controlling and directioning means for directioning all the heat into the car body, or directing all of the heat or heated air into the space surrounding the pedals, or to direct part of the air into the car body and part of it to the pedal surrounding space. With such arrangement the driver will have no difficulty in keeping his feet warm, even in the coldest weather.

In hot weather, when the space above the foot board of a car frequently becomes uncomfortably hot, my device can be used for receiving cooling air and for directioning the air to the driver's feet or to other places where cooling is desired.

My improved device and one of its applications is disclosed on the accompanying drawing, in which Fig. 1 is a vertical cross-sectional view of the floor in the front end of a vehicle showing my improved device in end view;

Fig. 2 is an enlarged plan view of the device; and

Fig. 3 is a sectional view on plane 3—3 of Fig. 2.

The device shown comprises a rectangular enclosure or housing 10 which may be of sheet metal or in the form of a casting. The rear side of the housing is open so that the housing may be set over a heat or tempered air outlet O. In the front wall of the housing is a row of outlet openings 11 and slidable against the inner side of the housing front wall is the damper plate 12 which has the passageways 13 for registering to a greater or less degree with the passageways 11 in order to control the flow of heat or air from the housing. The damper may be secured in any suitable manner. As shown, it is guided by means of headed posts 14 traveling in guide slots 15, one of the posts having an enlarged head or knob 16, by means of which the damper may be readily shifted to the desired position. The outlet openings 11 preferably are at the inlet end of the housing so that such openings will be directly opposite the air or heat inlet O, over which the device is applied.

In the end wall of the housing I have provided a passageway 17 for the lateral outflow of heat or tempered air. Between such lateral outlet and the outlets 11, I interpose a damper or valve plate 18 which, as shown, is hinged along its upper edge along the under side of the housing front or top by means of a hinge rod 19. The valve plate is preferably secured to the hinge rod and the rod is provided with an extension or handle 20 so that it may be readily swung. By means of this damper or valve plate the direct or lateral outflow of heat or heated air from the housing may be controlled. If the valve plate is swung to extend entirely across the housing, the lateral outlet will be cut off from the heat which will flow through the outlets 11, provided the outlets are open. If the damper 12 is closed while the valve 18 extends across the housing, there will be no flow in any direction from the housing. By swinging the valve plate laterally in either direction, the heat or heated air can escape from the housing through the lateral outlet 17, and when the valve plate is swung outwardly a distance, as shown in Fig. 3, it will deflect the laterally travelling heat or air downwardly against the foot board F' on which the housing is seated. Such directioning of the heat or air is very desirable where the device is applied to the foot-board alongside of the controlling pedals 20 and 21 of a motor vehicle. By deflecting the heat or air to flow along the foot-board, the heat or air will pass along the soles of the driver's feet and not against the sides of the legs. As is well understood, the cold air blows in through the slots in which the pedal levers play, but by directing the heat to flow along the foot-board, this cold air will be tempered before it strikes the feet of the driver.

The housing 10 may terminate short of the engine accelerator button A so that the driver's foot resting on the button may be kept warm by the heat issuing from the housing lateral outlet, or, as shown, the housing may be extended to enclose the accelerator button, in which case the housing is provided with an opening 22 for receiving an extension button 23 for operating the accelerator button A. With this arrangement the driver can place his foot against the front wall of the housing while operating the accelerator button and his foot will be kept warm.

In winter time, my improved device will serve to control and direct the heat or heated air flow, while in summer time, the device will control and direction the flow of cooling air. The device is of very simple construction and can be inexpensively manufactured.

Changes and modifications can be made which will come within the scope of the invention, which I claim as follows:—

1. In an automotive vehicle, the combination with the vehicle controlling foot pedals and an operating stud, of a heat distributor mounted at one side of said pedals and enclosing said stud, an extension stud extending through said heat distributor into engagement with said operating stud, said heat distributor forming a support for the foot of the driver.

2. In an automotive vehicle, the combination with the vehicle controlling foot pedals and an operating stud, of a heat distributor mounted at one side of said pedals and enclosing said operating stud, an extension stud supported by said distributor and engaging said operating stud whereby said operating stud may be operated, said distributor forming a support for the driver's foot and having a heat outlet opening in its end for the flow of heat laterally along said pedals.

3. In an automotive vehicle, the combination with an inclined foot board and the vehicle foot controls of a heat distributor comprising a pan-shaped housing having a completely open bottom adapted to fit over existing air or heat inlets of different sizes opening through the foot board, and a top disposed generally parallel the foot board and forming a foot support with upright marginal walls surrounding the inlet, said housing having outlet means opening through the foot supporting top and lateral outlet means opening through one side for directing the heat or air laterally upon the driver's foot positioned to operate the controls.

4. In an automotive vehicle, the combination with an inclined foot board and the vehicle controls of a heat distributor comprising a pan-shaped housing having a completely open bottom adapted to fit over existing air or heat inlets of different sizes opening through the foot board, and a top disposed generally parallel the foot board and forming a foot support with upright marginal walls surrounding the inlet, said housing having outlet means opening through the foot supporting top and lateral outlet means opening through one side for directing the heat or air laterally upon the driver's foot positioned to operate the controls, a damper controlling the outlet means through the top of the housing, and a valve interposed between said lateral outlet and said damper controlled outlet means for proportioning the flow of tempered air through said outlets.

5. In an automotive vehicle, the combination with the vehicle foot controls of a heat distributor comprising a generally rectangular pan-shaped housing having a completely open bottom adapted to be attached to the floor of the vehicle over existing air or heat inlets of different sizes opening therethrough, and a top disposed generally parallel the floor of the vehicle and forming a foot support with upright marginal walls surrounding the inlet, said housing having outlet means opening through the foot supporting top and lateral outlet means opening through one side for directing the heat or air laterally upon the driver's foot positioned to operate the controls, and means for independently controlling the top and lateral outlet means to provide different ratios of the lateral and top heat or air discharge into the vehicle.

In witness whereof, I hereunto subscribe my name this 27th day of October, 1925.

ADOLPH J. JANECEK.